Sept. 27, 1960  J. N. HAIMSOHN ET AL  2,954,393
ALKYL THIOCYANATE ISOMERIZATION
Filed April 2, 1958
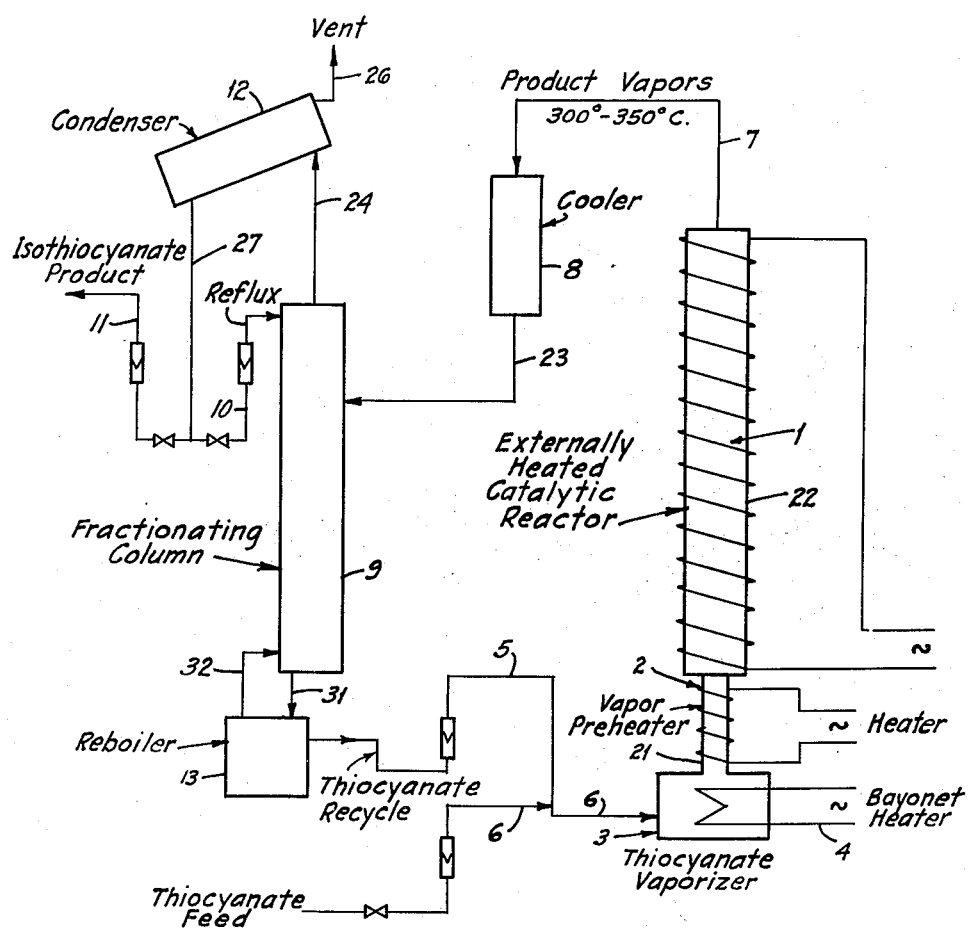
INVENTORS
Jerome N. Haimsohn
George Lukes
ECKHOFF & SLICK
ATTORNEYS
BY
A MEMBER OF THE FIRM

United States Patent Office 2,954,393
Patented Sept. 27, 1960

2,954,393

ALKYL THIOCYANATE ISOMERIZATION

Jerome N. Haimsohn, Ardsley, and George E. Lukes, Irvington, N.Y., assignors to Stauffer Chemical Company, a corporation of Delaware Filed Apr. 2, 1958, Ser. No. 725,784

12 Claims. (Cl. 260—454)

This invention relates to the manufacture of lower alkyl isothiocyanates such as methyl isothiocyanate, and particularly relates to the catalytic isomerization of methyl thiocyanate to methyl isothiocyanate in the vapor phase.

Methyl isothiocyanate is a valuable compound, particularly in the field of agricultural chemistry where methyl isothiocyanate has been found to be effective as a herbicide and against various pests.

Although it is known that certain thiocyanates, such as allyl and methallyl thiocyanates and similar derivatives with allylic systems, are isomerized readily to the corresponding isothiocyanates on heating, the conversion of the alkyl derivatives is far more difficult. In the past, isomerization of the lower alkyl thiocyanates has been carried out by heating the material in the liquid phase under pressure at elevated temperatures ranging up to about 180° C. for extended periods of time ranging from several hours to a day or more. Such processes are obviously deficient in many respects for the manufacture of the alkyl isothiocyanates on a commercial scale. Further, these processes are inefficient due to the loss of starting material as by products formed as a result of heating for such prolonged periods of time at the elevated temperatures.

In accordance with the present invention, methyl isothiocyanate and other lower alkyl isothiocyanates are produced by passing the appropriate alkyl thiocyanate over an isomerization catalyst, in vapor phase, at a temperature of from 200° to 400° C. or more. Isomerization catalysts are known to those skilled in the art, and specific directions for making preferred catalysts are given hereinafter. Alkyl thiocyanates having from 1 to 4 carbon atoms are suitable for use. The reaction can be easily carried out with a fixed bed catalyst, but it can also be done with a fluidized catalyst.

This vapor phase reaction at the elevated temperatures requires a catalyst. No isomerization occurs in the absence of catalyst, even at the high temperatures, due to the short residence (contact) times within the hot reaction zone. The short residence time has the advantage, however, of minimizing the loss of starting material as by products, and high yields of the desired alkyl isothiocyanates are obtained. Further, the process of the present invention can be operated in a continuous manner thereby providing an efficient, low-cost commercial method for the manufacture of methyl isothiocyanate and the other lower alkyl derivatives.

In the drawing forming a part of this application, an apparatus for the isomerization of a lower alkylthiocyanate to an isothiocyanate is illustrated.

Referring particularly to the drawing, fresh thiocyanate feed is supplied through line 6, together with thiocyanate recycle from line 5, to a thiocyanate vaporizer 3, the latter being provided with a suitable bayonet heater 4. The vaporized thiocyanate issues from vaporizer 3 through the tube 21 into the externally heated catalytic reactor, generally indicated at 1, the tube 21 including an electric heater, generally indicated at 2, to heat the vapor in the tube. The externally heated catalytic reactor 1 includes a resistance wire wrapping 22, which is supplied with current from a source, not shown. The vapor products issuing from the reactor 1 are taken through line 7 to a cooler 8 and are then fed through line 23 into a fractionating column 9 at about the midpoint of the column 9. Vapors issuing from the column 9 pass through line 24 into a condenser 12 having a fixed gas vent 26. Materials condensing in the condenser 12 are taken off through line 27, a portion being returned through line 10 as reflux to column 9 and another portion being taken off through line 11 as isothiocyanate product. The bottoms from the fractionating column 9 are withdrawn through line 31 into a reboiler 13, a portion of the material issuing from the reboiler being returned to the column through line 32, while another portion is taken off through line 5 as thiocyanate recycle.

For the higher members of the alkyl thiocyanate series, it is preferred that the fractionation unit be operated under reduced pressure to reduce residence time at the normal boiling temperatures. Thus, decomposition resulting from prolonged retention at elevated temperatures can be minimized.

Among the catalysts that have been found effective in catalyzing the isomerization reaction are: anhydrous silica gel alone; anhydrous silica gel impregnated with salts such as an alkali metal thiocyanate as potassium thiocyanate or sodium thiocyanate, cadmium iodide, and zinc chloride; potassium thiocyanate supported on a porous solid carrier such as activated charcoal and pumice; cadmium iodide supported on a porous solid carrier such as activated charcoal. Of these several catalyst compositions, anhydrous silica gel impregnated with potassium thiocyanate gave superior results. However, catalysts other than these specific catalysts can be used.

One suitable catalyst was made by mixing 450 grams of a solution containing 65 percent by weight of potassium thiocyanate in water with 800 cc. of silica gel ranging from −6 to +16 mesh. The mixture was heated to boil off the excess water and was stirred intermittently to prevent agglomeration.

Other catalysts were prepared in the same manner by mixing the following:

| | Solution | | | Solid | |
|---|---|---|---|---|---|
| Salt | Wt. of Solution, g. | Conc., Wt. Percent | Size U.S. Mesh | Volume, cc. | Material |
| NaSCN | 500 | 50 | −6 +16 | 800 | Silica Gel. |
| ZnCl$_2$ | 400 | 65 | −6 +16 | 800 | Do. |
| CdI$_2$ | 600 | 45 | −6 +16 | 800 | Do. |
| KSCN | 450 | 65 | −8 +20 | 800 | Act. Charcoal. |
| CdI$_2$ | 600 | 45 | −8 +20 | 800 | Do. |
| KSCN | 450 | 65 | −8 +20 | 800 | Pumice. |

The final drying of the catalyst is carried out in a reaction chamber at a temperature which is at least 50° C. greater than the preferred operative temperature at which the catalyst is to be ultimately used. It has been found that the moisture content of the catalyst is very important with respect to catalyst life and selectivity. In other words, if there is moisture on the catalyst, there will be a greater by product formation and the life of a catalyst will be appreciably shortened.

The following examples illustrate methods of carrying out the present invention.

*Example 1.*—A catalyst chamber was employed with 1" inside diameter and 4 feet long. The chamber was made of glass tubing with an external electrical heating coil. Adjacent the bottom of the reaction chamber, a vaporizer was provided for vaporizing methyl thiocyanate and introducing it into the column. The column was also equipped with an air condenser and a graduated product receiver, as well as a Dry Ice trap to collect byproduct gases. To the column thus described, there was charged 440 cc. of dry catalyst, silica gel impregnated with potassium thiocyanate, made as above. The column was heated to a temperature of 350° C. while purging it with a dry inert gas (nitrogen) for three hours to dehydrate the catalyst. The system was then allowed to cool to 300° C., but inert gas was continually passed through the chamber. Methyl thiocyanate was then vaporized and fed into the column at the rate of 1 gram per minute. The gas rate through the catalyst was approximately 0.07 feet per second, and the space rate was approximately 1½ cubic feet of gas per minute per cubic foot of catalyst. In this manner, there was introduced a total of 154 grams of methyl thiocyanate, and there was recovered an isomer mixture consisting of 146 grams of product. This product was fractionated and found to contain 83 grams of methyl isothiocyanate. Thus, the percent conversion of methyl thiocyanate to methyl isothiocyanate was 54 percent and there was a 95 percent recovery of both isomers. The isomer mixture can be fractionated, since the isothiocyanate boils at a lower temperature than the thiocyanate and the thiocyanate can be returned to the reactor with make-up thiocyanate for conversion.

(In contrast, the above described process was repeated except that the catalyst chamber was filled with −6 to +16 mesh quartz chips, instead of catalyst, and the column was maintained at 350° C. Methyl thiocyanate was passed through the column at the same rate of 1 gram per minute. The condensed product showed no detectable methyl isothiocyanate by infrared analysis.)

*Example 2.*—The process of Example 1 was repeated except that the feed rate was doubled; about 2 grams per minute of methyl thiocyanate was introduced into the column. The total input of methyl thiocyanate was 494 grams and the total recovery of the isomeric mixture was 488 grams. From this, there was obtained a total of 190 grams of methyl isothiocyanate, giving a percent conversion of 39 percent, based on the methyl thiocyanate introduced into the column.

*Example 3.*—Example 1 was again repeated except that the catalyst was dehydrated for three hours at a temperature of 400° C. and the column was maintained at a temperature of 350° C. during the introduction of the methyl thiocyanate. The feed rate was 2 grams per minute. The conversion of methyl thiocyanate to methyl isothiocyanate was 55 percent.

*Example 4.*—Using ethyl thiocyanate, the process of Example 1 was repeated, except that the catalyst was dehydrated at 400° C. and the column was maintained at a temperature of 350° C. during the isomerization reaction. The feed rate of ethyl thiocyanate was 2 grams per minute. The conversion of ethyl thiocyanate to its isothiocyanate isomer was 51 percent.

*Example 5.*—The process of Example 1 was repeated in a series of seven runs, each employing a different catalyst, made as described above. In each case, the catalyst chamber was charged with 440 cc. of the respective catalyst, the methyl thiocyanate feed rate was 1 gram per minute, and the duration of each run was 3 hours. The conditions and results of the series of runs are summarized as follows:

| Run No. | Catalyst | Catalyst Dehydration Temp., °C. | Run Temp., °C. | Percent MeNCS in Product |
|---|---|---|---|---|
| 1 | Silica Gel | 450 | 400 | 24 |
| 2 | Silica Gel plus Sodium Thiocyanate | 425 | 350 | 47 |
| 3 | Silica Gel plus Cadmium Iodide | 425 | 350 | 41 |
| 4 | Silica Gel plus Zinc Chloride | 400 | 350 | 38 |
| 5 | Potassium Thiocyanate on Activated Charcoal | 415 | 350 | 43 |
| 6 | Cadmium Iodide on Activated Charcoal | 415 | 350 | 37 |
| 7 | Potassium Thiocyanate on Pumice | 425 | 375 | 40 |

The methyl isothiocyanate content of products was determined by infrared analysis.

This is a continuation-in-part of our application Serial No. 499,620, filed April 6, 1955, now abandoned.

We claim:

1. A process of manufacturing a lower alkyl isothiocyanate comprising: vaporizing a lower alkyl thiocyanate and passing the vaporized thiocyanate into a reaction zone provided with an isomerization catalyst selected from the group consisting of anhydrous silica gel, anhydrous silica gel impregnated with a salt selected from the group consisting of an alkali metal thiocyanate, cadmium iodide and zinc chloride, potassium thiocyanate supported on a porous solid carrier and cadmium iodide supported on a porous solid carrier, said reaction zone being maintained at a temperature of from 200° C. to 400° C., and removing the isomerized product from the zone.

2. The process of claim 1 wherein the isomerization catalyst consists of silica gel impregnated with potassium thiocyanate.

3. The process of claim 1 wherein the isomerization catalyst consists of silica gel impregnated with an alkali metal thiocyanate.

4. The process of claim 1 wherein the isomerization catalyst consists of potassium thiocyanate supported on a porous solid carrier.

5. The process of claim 1 wherein the isomerization catalyst consists of cadmium iodide supported on a porous solid carrier.

6. The process of claim 1 wherein the isomerization catalyst consists of silica gel.

7. The process of making methyl isothiocyanate comprising: vaporizing methyl thiocyanate and passing it into a reaction zone at a temperature of from about 200° C. to 400° C. in the presence of an isomerization catalyst selected from the group consisting of anhydrous silica gel, anhydrous silica gel impregnated with a salt selected from the group consisting of an alkali metal thiocyanate, cadmium iodide and zinc chloride, potassium thiocyanate supported on a porous solid carrier and cadmium iodide supported on a porous solid carrier.

8. The process of claim 7 wherein the isomerization catalyst consists of silica gel impregnated with potassium thiocyanate.

9. The process of claim 7 wherein the isomerization catalyst consists of silica gel impregnated with an alkali metal thiocyanate.

10. The process of claim 7 wherein the isomerization catalyst consists of potassium thiocyanate supported on a porous solid carrier.

11. The process of claim 7 wherein the isomerization catalyst consists of cadmium iodide supported on a porous solid carrier.

12. The process of claim 7 wherein the isomerization catalyst consists of silica gel.

References Cited in the file of this patent

Sidgwick's Organic Chemistry of Nitrogen (1937), page 335.